April 4, 1950 E. BLAIN 2,502,697
METHOD FOR UNIVERSAL PHOTOSCULPTURE
IN HIGH RELIEF AND LOW RELIEF
Filed Feb. 4, 1947 2 Sheets-Sheet 1
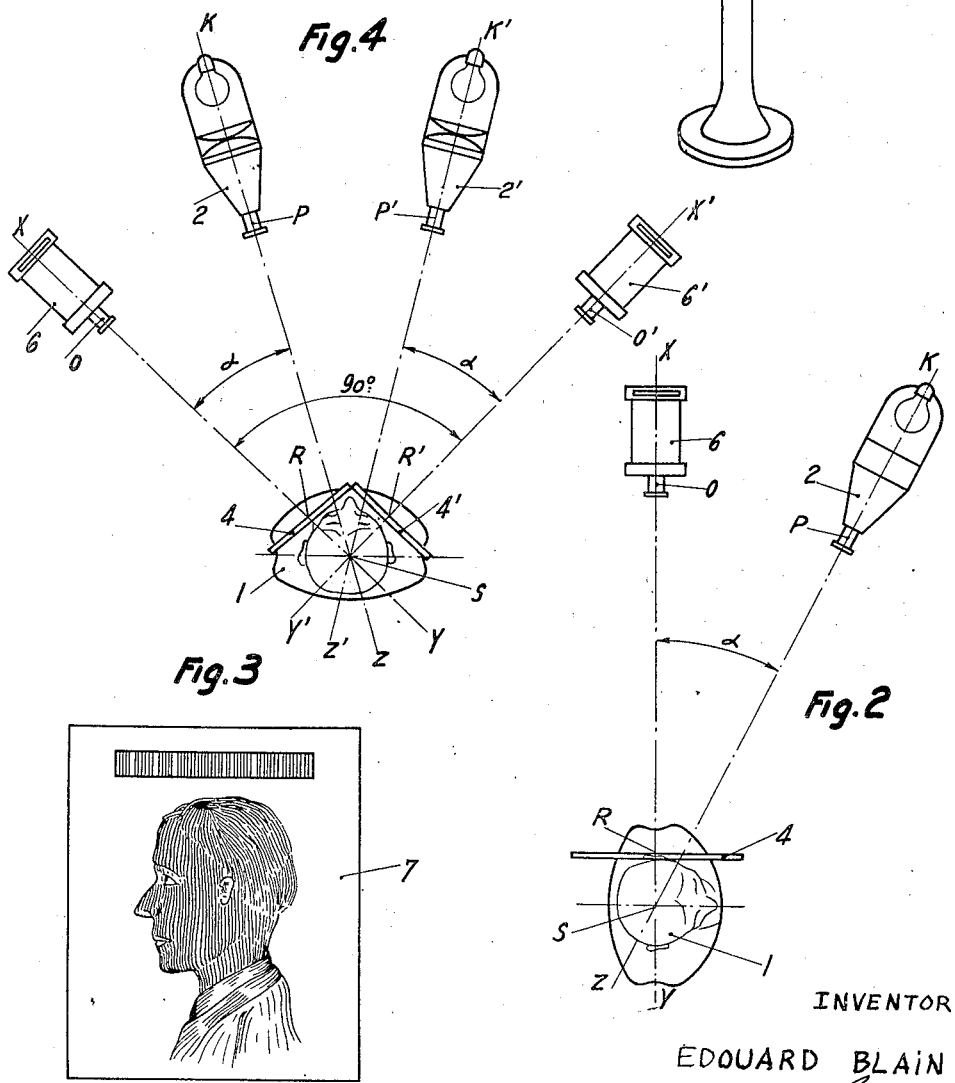
INVENTOR
EDOUARD BLAIN
BY [signature]
ATTY.

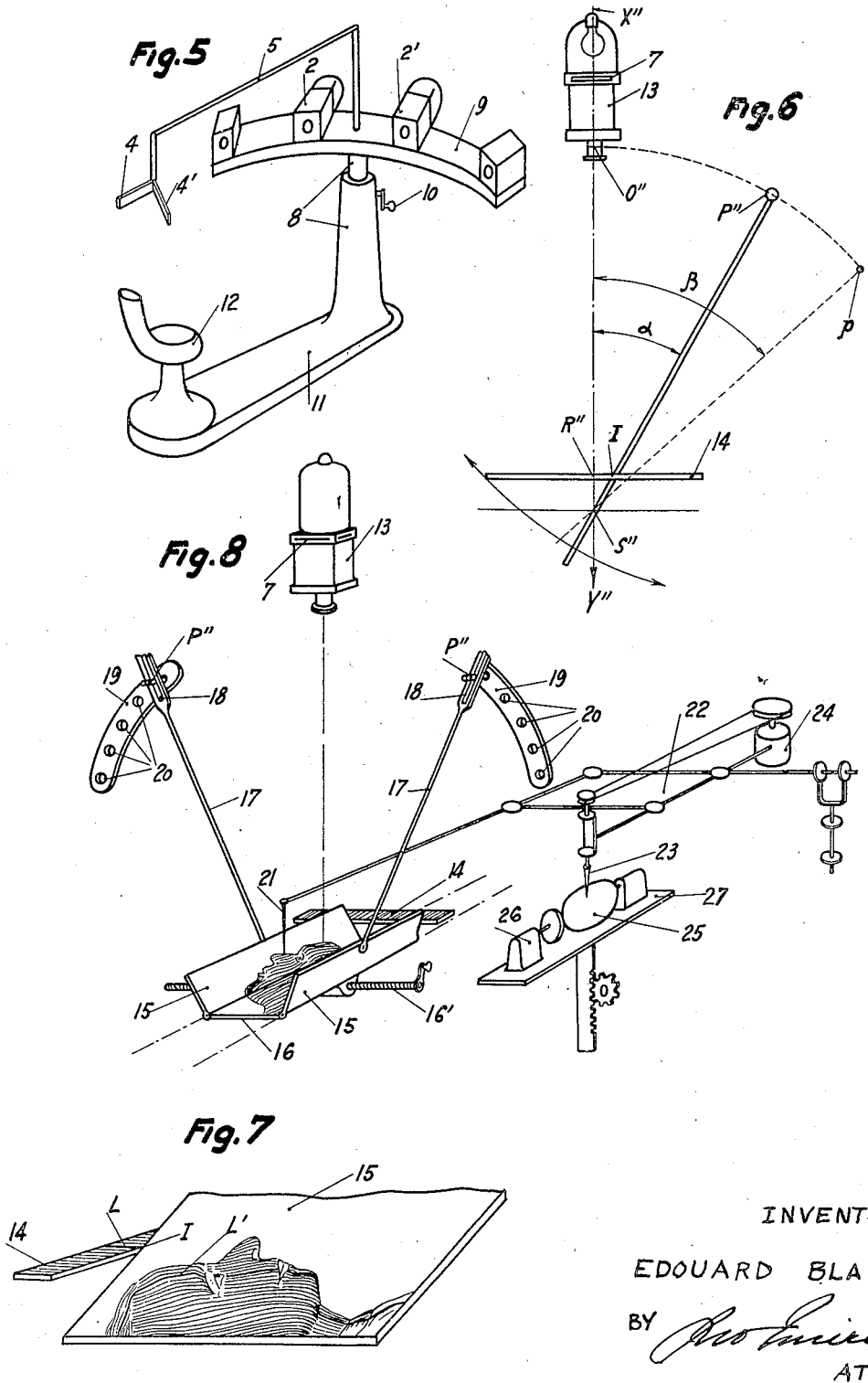

Patented Apr. 4, 1950

2,502,697

UNITED STATES PATENT OFFICE 2,502,697

METHOD FOR UNIVERSAL PHOTOSCULPTURE IN HIGH RELIEF AND LOW RELIEF

Edouard Blain, Rochefort-sur-Mer, France

Application February 4, 1947, Serial No. 726,328
In France March 19, 1946

6 Claims. (Cl. 41—25)

The method and the device forming the object of this invention serve the purpose of executing rapidly and with precision pieces of sculpture, either in low relief or in high relief, with the aid of photographs which can be taken in any place.

The method according to this invention and the device for its execution will be described hereafter with reference to the accompanying drawings on which:

Fig. 1 is a perspective view of the original to be reproduced and of a first projector and a first reference screen used while taking the photograph of the original.

Fig. 1a is a detail view of a ruled plate placed in said projector.

Fig. 2 is a schematical plan view of a device for taking the photograph of the original.

Fig. 3 shows the obtained photograph of the original and first reference screen.

Fig. 4 is a schematical plan view of a device for taking photographs from both sides of the original.

Fig. 5 is a perspective view of a device for taking the photographs of the original.

Fig. 6 is a schematical plan view of a device for reproducing the original.

Fig. 7 is a fragmentary perspective view of a second reference screen and of a reproducing screen, during the operation of reproducing the original.

Fig. 8 is a perspective view of a device for reproducing the original.

The method according to this invention comprises three operations:

1. The taking of the photograph or photographs of the original.
2. The photographic reproduction of the original.
3. The mechanical reproduction of the original.

The taking of the photographs is effected in two different manners, according to whether it is desired to reproduce only one side of the original, in the shape of a more or less flat relief, such as a medal, or if the original is to be reproduced entirely, for example as a bust.

When it is desired to reproduce only one side of an original I (Fig. 1), the same is exposed to the rays of a first projector 2 mounted on a support 8 of adjustable height. In said first projector 2 is placed a ruled plate 3 (Figs. 1 and 1a) which is opaque and is ruled with vertical transparent lines which are grouped irregularly, for a purpose to be explained later. The first projector 2 thus produces a fanlike series of luminous planes diverging from the vertical line passing through the optical center P of its objective. A first reference screen 4, connected to the said first projector 2 by an arm 5, is placed adjacent to the original I, so as to be also exposed to the rays of the projector 2. This first reference screen 4 is preferably placed above the original I, between the vertical line passing through the center of the original and a vertical line passing through the foreground of the original.

The manner of taking the photograph is schematically illustrated on Fig. 2. The photographic camera 6 may be of any usual type provided its focal length is known. The optical axis X—Y of this camera intersects the optical axis K—Z of the first projector 2 in a point S near the center of the original I. The first reference screen 4 is placed in a plane perpendicular to the axis X—Y which intersects said plane in a point R. The axes X—Y and K—Z form an angle $\alpha$ which may have a value between 25° and 45°, the most convenient value being 30°. O and P are the optical centers of the objectives of the photographic camera 6 and first projector 2 respectively.

The photograph 7 obtained under the conditions represented on Fig. 2 is shown on Fig. 3. This photograph carries, on the one hand, the images of a series of deformed luminous lines produced by the above mentioned luminous planes on said original I, and, on the other hand, the images of a series of straight luminous lines produced by said luminous planes on said first reference screen 4.

When it is desired to reproduce the original completely, with all its surfaces, the device is duplicated as schematically shown on Fig. 4. The first projector 2, the camera 6 and the first reference screen 4 are symmetrically duplicated by another first projector 2', another camera 6' and another first reference screen 4', the optical axes X—Y and X'—Y' of the camera 6 and 6' forming an angle of 90° between themselves and intersecting at the point S, and the reference screens 4 and 4' being connected together at right angle.

An embodiment of this device is shown, by way of example, on Fig. 5. The projectors 2 and 2' and the cameras 6 and 6' are carried by a member 9 to which the pair of reference screens 4, 4' is connected by the arm 5. The member 9 is carried by the support 8 the height of which is adjustable by means of a crank handle 10. The support 8 is fixed on a base plate 11 on which is also mounted a pivotable seat 12 for the person constituting the original to be reproduced.

In practice, two photographs at ¾ right and left are first taken of the front part of the original, whereafter the pivotable seat 12 is turned round at 180°, and similar photographs are taken of the rear part of the original.

The subsequent photographic reproduction has for its object the reconstitution, by projection of the photographic image obtained as described above, of the deformed luminous lines which had been produced on the original 1 by the above mentioned luminous planes.

This reproduction is schematically illustrated on Fig. 6 which is geometrically similar to Fig. 2, the points O, R, S and P of Fig. 2 becoming O″, R″, S″ and P″ on Fig. 6. The point O″ is the optical center of a second projector 13 having the same focal length as the camera 6 of Fig. 2 and into which is inserted the above mentioned photograph 7. The light rays emitted by said second projector 13 thus follow in opposite direction the same paths which were followed by the light rays going to the camera 6 when the photograph was taken. A second reference screen 14 is placed in the same geometrical position which was previously occupied by the first reference screen 4, so that the straight luminous lines photographed on said first reference screen 4 are now identically reproduced by projection on the second reference screen 14.

On the other hand, a reproducing screen 15 is mounted so as to be able to rotate about an axis passing through the point P″ occupying the position which was previously occupied by the optical center P of the first projector 2, so that said reproducing screen 15 can be brought successively to the different positions which were occupied by the luminous planes emitted by said first projector 2.

When the photograph was taken, to every deformed luminous line produced on the original 1 by one of the said luminous planes corresponded a straight luminous line produced on the first reference screen 4 by the same luminous plane. Similarly, to each straight line now projected upon the second reference screen 14 corresponds a deformed line now projected upon the reproducing screen 15. Therefore, when the reproducing screen 15 pivoting about P″ is brought to coincide at the point 1 with a particular straight line L on the second reference screen 14, as shown on Fig. 7, the corresponding deformed line L′ on the reproducing screen 15 will have exactly the same shape as the deformed luminous line initially produced on the original 1. By shifting the reproducing screen 15 successively to every position initially occupied by the said luminous planes, it is thus possible to obtain step by step a true reconstitution of the original 1. As previously stated, the transparent lines on the ruled plate 3 are grouped irregularly, so that the lines which are subsequently projected upon the second reference screen 14 and upon the reproducing screen 15 will also be grouped irregularly, which makes it easier to locate the particular line L′ on the reproducing screen 15 which corresponds to each line L on the second reference screen 14 (Fig. 7).

When it is desired to reproduce the original 1 in low relief, it will be sufficient to displace the point P″ (Fig. 6) on an arc having S″ for its center, away from the second projector 13, for instance to a point p, so that the angle β formed between the reproducing screen 15 and the optical axis X″—Y″ of said second projector 13 becomes greater than α.

An embodiment of the reproducing device is shown, by way of example, on Fig. 8. A plate 16 is mounted so as to be horizontally displaceable by means of a screw 16′. To this plate are hinged two reproducing screens 15 each of which is prolonged by a rod 17 ending in a fork 18 guided on a pivot pin P″. The pivot pins P″ can be inserted into different holes 20 formed in arc-shaped members 19, so as to obtain the reproduction in high relief or in a more or less low relief. The second projector 13 and the second reference screen 14 are located as described above with reference to Fig. 6. Two reproducing screens 15 are provided for the reproduction of the right and left profile of the original respectively.

In order to reproduce in any appropriate material the lines which are successively reconstituted on the screens 15, it will be sufficient to follow the said lines with the control member 21 of a pantographic transmission 22 which is movable in all directions and transmits the movements of said control member 21, at the desired scale, to a reproducing tool such as a cutter 23 which is rotated at high speed by a motor 24 the weight of which balances the weight of the whole device. The piece of material 25 to be worked by the cutter 23 is placed on a support 26, which, when a bust is to be made, can be secured in four positions, and is itself mounted on a vertically adjustable supporting plate 27.

When a low-relief such as a medal is to be made, the piece of material 25 is mounted directly upon the plate 27.

It will be understood that the object of this invention has been described and illustrated only by way of example, and that various modifications may be made therein without departing from its essential features.

I claim:

1. A method of photosculpture which comprises placing a first reference screen above the original between a vertical line passing through the center of said original and a vertical line passing through the foreground of said original projecting upon said original and reference screen, a series of luminous planes to produce on said first reference screen a series of straight luminous lines and on said original a corresponding series of luminous lines which are deformed in accordance with the surface of the original photographing said lined original and reference screen from a direction forming an acute angle with the projection axis to obtain a photograph carrying the images of said straight lines and of said deformed lines, projecting the obtained photographic image at substantially the same acute angle as that from which the photograph was taken, upon a second reference screen and a reproducing screen which is pivoted about an axis occupying with respect to the point of projection and second reference screen the same position which said vertical axis occupied with respect to photographing point and said first reference screen, pivoting said reproducing screen to successively bring into coincidence the edge of said reproducing screen with the straight line images on said reference screen, and following the image of the corresponding deformed line projected upon said reproducing screen with the control member of a reproducing device adapted to transmit the movements of said control member to a reproducing tool.

2. A method as claimed in claim 1, wherein the value of said acute angle is between 25° and 45°.

3. A method as defined in claim 1, wherein said luminous planes are irregularly grouped to facilitate the location of corresponding straight and deformed line images.

4. A method of photosculpture which comprises placing a first reference screen above the original between a vertical line passing through the center of said original and a vertical line passing through the foreground of said original, projecting upon said original and upon said first reference screen a series of vertical luminous planes to produce on said first reference screen a series of straight luminous lines and on said original a corresponding series of luminous lines which are deformed in accordance with the surface of the original, photographing said original and first reference screen, from a direction forming an acute angle with the projection axis to obtain a photograph carrying the images of said straight lines and of said deformed lines, projecting the obtained photographic image upon a second reference screen occupying with respect to the projection point a position corresponding to the position which said first reference screen occupied with respect to the photographing point and upon a reproducing screen which pivots about an axis positioned with respect to said second reference screen in a direction forming with the projection axis an angle which is greater than said acute angle, pivoting said reproducing screen to successively bring into coincidence the edge of said reproducing screen with the straight line images on said second reference screen, and following the image of the corresponding deformed line projected upon said reproducing screen with the control member of a reproducing device adapted to transmit the movements of said control member to a reproducing tool.

5. A method as defined in claim 4, wherein the value of said acute angle is between 25° and 45°.

6. A method as defined in claim 4, wherein said luminous planes are irregularly grouped, to facilitate the location of corresponding straight and deformed line images.

EDOUARD BLAIN.

REFERENCES CITED

The following references are of record in the file of this patent:

UNITED STATES PATENTS

| Number | Name | Date |
| --- | --- | --- |
| 891,013 | Smith | June 16, 1908 |
| 1,801,200 | Howell | Apr. 14, 1931 |
| 2,066,996 | Morioka | Jan. 5, 1937 |
| 2,085,400 | Tomazawa | June 29, 1937 |
| 2,092,765 | Losier | Sept. 14, 1937 |
| 2,283,064 | Hilbrand | May 12, 1942 |
| 2,335,127 | Ling | Nov. 23, 1943 |
| 2,350,796 | Morioka | June 6, 1944 |
| 2,386,816 | Scholz | Oct. 16, 1945 |